United States Patent
Hung et al.

(10) Patent No.: US 9,515,552 B2
(45) Date of Patent: Dec. 6, 2016

(54) VOLTAGE REGULATOR AND VOLTAGE REGULATING METHOD AND CHIP USING THE SAME

(71) Applicant: Nuvoton Technology Corporation, Hsinchu Science Park (TW)

(72) Inventors: Ming-Che Hung, Hsinchu Science Park (TW); Ciao-Ling Lu, Xinpu Township, Hsinchu County (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 185 days.

(21) Appl. No.: 14/450,638

(22) Filed: Aug. 4, 2014

(65) Prior Publication Data
US 2015/0326119 A1    Nov. 12, 2015

(30) Foreign Application Priority Data

May 7, 2014  (TW) .............................. 103116198 A (51) Int. Cl.
| | |
|---|---|
| G06F 1/32 | (2006.01) |
| H02M 3/157 | (2006.01) |
| H02J 9/00 | (2006.01) |
| H02M 1/00 | (2006.01) |
| G06F 1/26 | (2006.01) |

(52) U.S. Cl.
CPC .............. *H02M 3/157* (2013.01); *H02J 9/005* (2013.01); *G06F 1/26* (2013.01); *H02M 2001/0032* (2013.01); *Y02B 70/16* (2013.01)

(58) Field of Classification Search
None
See application file for complete search history.

(56) References Cited

U.S. PATENT DOCUMENTS

| | | | |
|---|---|---|---|
| 6,603,292 B1 | 8/2003 | Schouten et al. | |
| 7,208,925 B2 | 4/2007 | Rose | |
| 7,362,080 B2 | 4/2008 | Sohn et al. | |
| 7,459,891 B2 | 12/2008 | Al-Shyoukh et al. | |
| 2003/0011247 A1 | 1/2003 | Kajiwara et al. | |
| 2006/0170401 A1* | 8/2006 | Chen ....................... | G05F 1/575 323/273 |
| 2007/0055896 A1* | 3/2007 | Er ............................ | G06F 1/26 713/300 |

(Continued)

FOREIGN PATENT DOCUMENTS

| | | |
|---|---|---|
| CN | 201638100 | 11/2010 |
| TW | 475107 | 2/2002 |
| TW | 200623574 A | 7/2006 |

(Continued)

OTHER PUBLICATIONS

Office Action issued on Jun. 30, 2015 in corresponding TW Patent Application No. 103116198.

(Continued)

*Primary Examiner* — Paul Yanchus, III
(74) *Attorney, Agent, or Firm* — Muncy, Geissler, Olds & Lowe, P.C.

(57) ABSTRACT

A voltage regulator with an on/off control on the control terminal of the power transistor of the voltage regulator. The power transistor of the voltage regulator drives the conversion from a first voltage to a second voltage. The voltage regulator provides a power-saving switch at the control terminal of the power transistor, and includes a power-saving control circuit controlling the power-saving switch. When the power-saving switch is turned on, the control signal for the power transistor is conveyed into the control terminal of the power transistor. When the power-saving switch is turned off, the connection between the control signal for the power transistor and the control terminal of the power transistor broken.

17 Claims, 11 Drawing Sheets

(56) References Cited

U.S. PATENT DOCUMENTS

2013/0176009 A1* 7/2013 Yang .................. G05F 1/56
323/274

FOREIGN PATENT DOCUMENTS

| TW | 201327085 A1 | 7/2013 |
|---|---|---|
| WO | WO 98/21886 A1 | 5/1998 |
| WO | WO 03/096508 A2 | 11/2003 |

OTHER PUBLICATIONS http://natisbad.org/NAS/refs/Nuvoton_NCT3012S.pdf, "Nuvoton Advanced Power Control IC NCT3012S", Nuvoton Confidential, Jul. 2009, 17 pages.

http://www.st.com/web/en/resource/technical/document/datasheet/CD00159862.pdf, "Monolithic VR for chipset and DDR2/3 supply for ultra-mobile PC (UMPC) applications", www.st.com, May 2009, 47 pages.

http://www.richtek.com/product_detail.jsp?s=438, "Complete DDRII/DDRIII Memory Power Supply Controller", RT8207, Mar. 2011, 22 pages.

http://www.datasheet4u.com/pdf/571564/RichTek/RT9183.html, "Ultra Low Dropout 1.5A Linear Regulator", www.richtek.com, Dec. 2003, 15 pages.

Office Action and Search Report issued on Mar. 24, 2016 in corresponding TW application No. 104128595 (5 pages).

* cited by examiner

VOLTAGE REGULATOR AND VOLTAGE REGULATING METHOD AND CHIP USING THE SAME

CROSS REFERENCE TO RELATED APPLICATIONS

This application claims priority of Taiwan Patent Application No. 103116198, filed on May 7, 2014, the entirety of which is incorporated by reference herein.

BACKGROUND OF THE INVENTION

Field of the Invention

The present invention relates to a voltage regulator and in particular to a voltage regulator with a power-saving function.

Description of the Related Art

Figure 1:
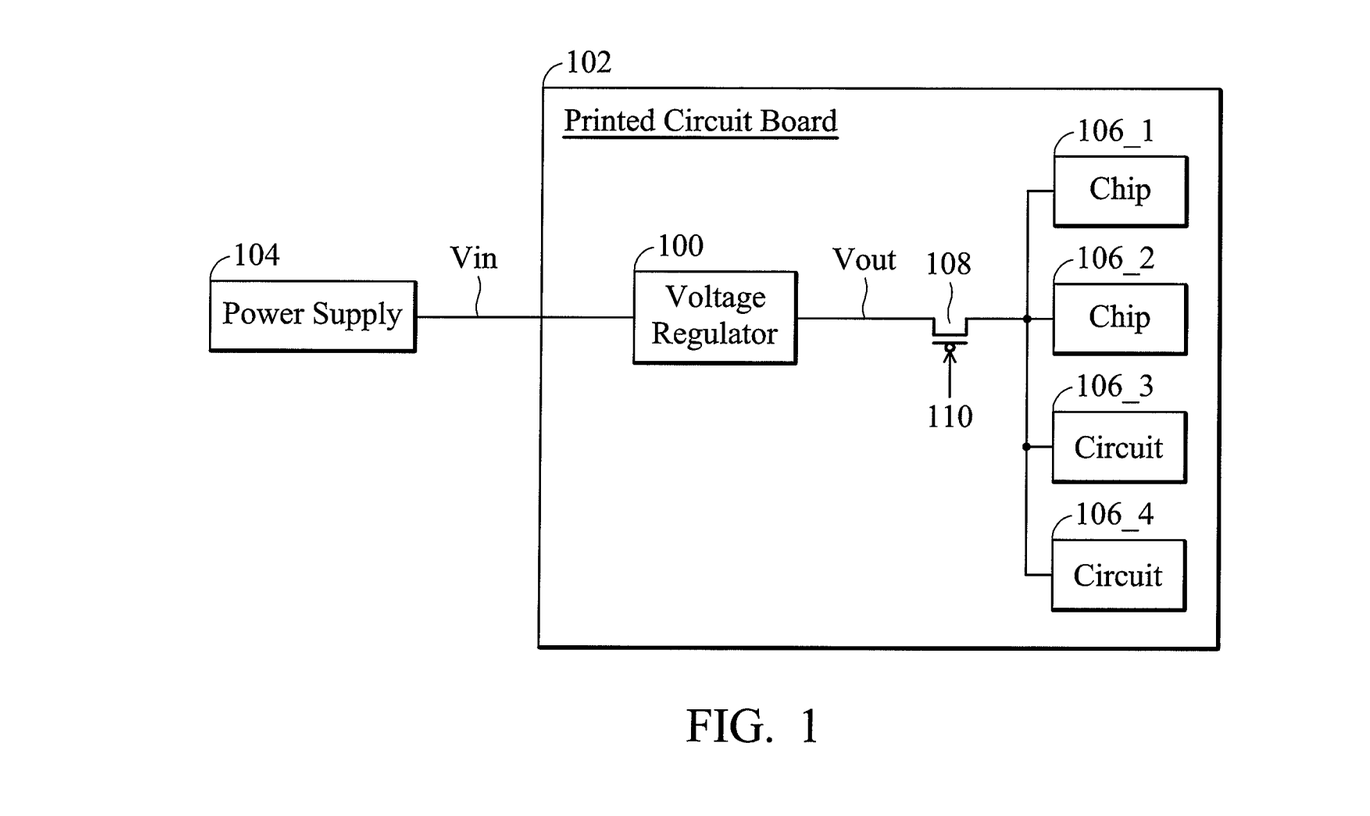
FIG. 1 depicts a conventional power-saving design for a voltage regulator 100.

FIG. 1 illustrates conventional power-saving technology for a voltage regulator 100. The voltage regulator 100 is mounted on a printed circuit board 102 to receive a first voltage Vin from a power supply 104 and convert the first voltage Vin to a second voltage Vout to power the modules (e.g. chips or circuits) 106_1 to 106_4 on the printed circuit board 102. As shown, a switch 108 is coupled between the voltage regulator 100 and the modules 106_1 to 106_4 and controlled by a control signal 110. The switch 108 is turned off when there is a need to save power. Power saving is achieved by breaking the connection between the second voltage Vout and the modules 106_1 to 106_4.

However, when the modules 106_1 to 106_4 are switched to a power-saving mode, the voltage regulator 100 still keeps working and consumes considerable power.

BRIEF SUMMARY OF THE INVENTION

A voltage regulator having a power transistor whose control terminal is coupled to or discoupled from a previous stage is disclosed with improved power-saving efficiency.

A voltage regulator in accordance with an exemplary embodiment of the disclosure includes a power transistor, a power-saving switch and a power-saving switch control circuit. The power transistor drives a conversion from a first voltage to a second voltage and has a control terminal. The power-saving switch has one terminal coupled to the control terminal of the power transistor and is turned on or turned off the power transistor in accordance with the power-saving switch control circuit. When the power-saving switch is turned on, a control signal for the power transistor is coupled to the control terminal of the power transistor. When the power-saving switch is turned off, the control signal for the power transistor is discoupled from the control terminal of the power-transistor.

In another exemplary embodiment of the disclosure, the power-saving switch control circuit turns off the power-saving switch when a module powered by the second voltage is switched to a standby mode. The voltage regulator may further include a voltage evaluation logic circuit which outputs a power flag to indicate whether the second voltage is reliable based on the first voltage and the second voltage. The power-saving switch control circuit may further receive the power flag. When the power flag shows that the second voltage is reliable, the power-saving switch control circuit permits the module powered by the second voltage to wake up from the standby mode.

In another exemplary embodiment, a voltage regulating method is disclosed, which provides a power-saving switch within a voltage regulator. The power-saving switch has one terminal coupled to a control terminal of the power transistor. The power transistor drives the conversion from a first voltage to a second voltage based on the status of the control terminal of the power transistor. When the power-saving switch is turned on, a control signal for the power transistor is coupled to the control terminal of the power transistor. When the power-saving switch is turned off, the control signal for the power transistor is discoupled from the control terminal of the power transistor. The power-saving switch is turned off when a module powered by the second voltage is switched to a standby mode.

A chip in accordance with an exemplary embodiment of the disclosure includes a power transistor, a power-saving switch, a power-saving switch control circuit, a first pin, a second pin, a third pin and a fourth pin. The power transistor is operative to drive the conversion from a first voltage to a second voltage and has a control terminal. The power-saving switch has one terminal coupled to the control terminal of the power transistor and is turned on or turned off in accordance with a power-saving switch control circuit. When the power-saving switch is turned on, a control signal for the power transistor is coupled to the control terminal of the power transistor. When the power-saving switch is turned off, the control signal for the power transistor is discoupled from the control terminal of the power transistor. The first pin is coupled to the first voltage. The second pin outputs the second voltage. The third pin is coupled to ground. The fourth pin receives a feedback voltage. The feedback voltage received by the chip is operative to adjust the control signal for the power transistor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
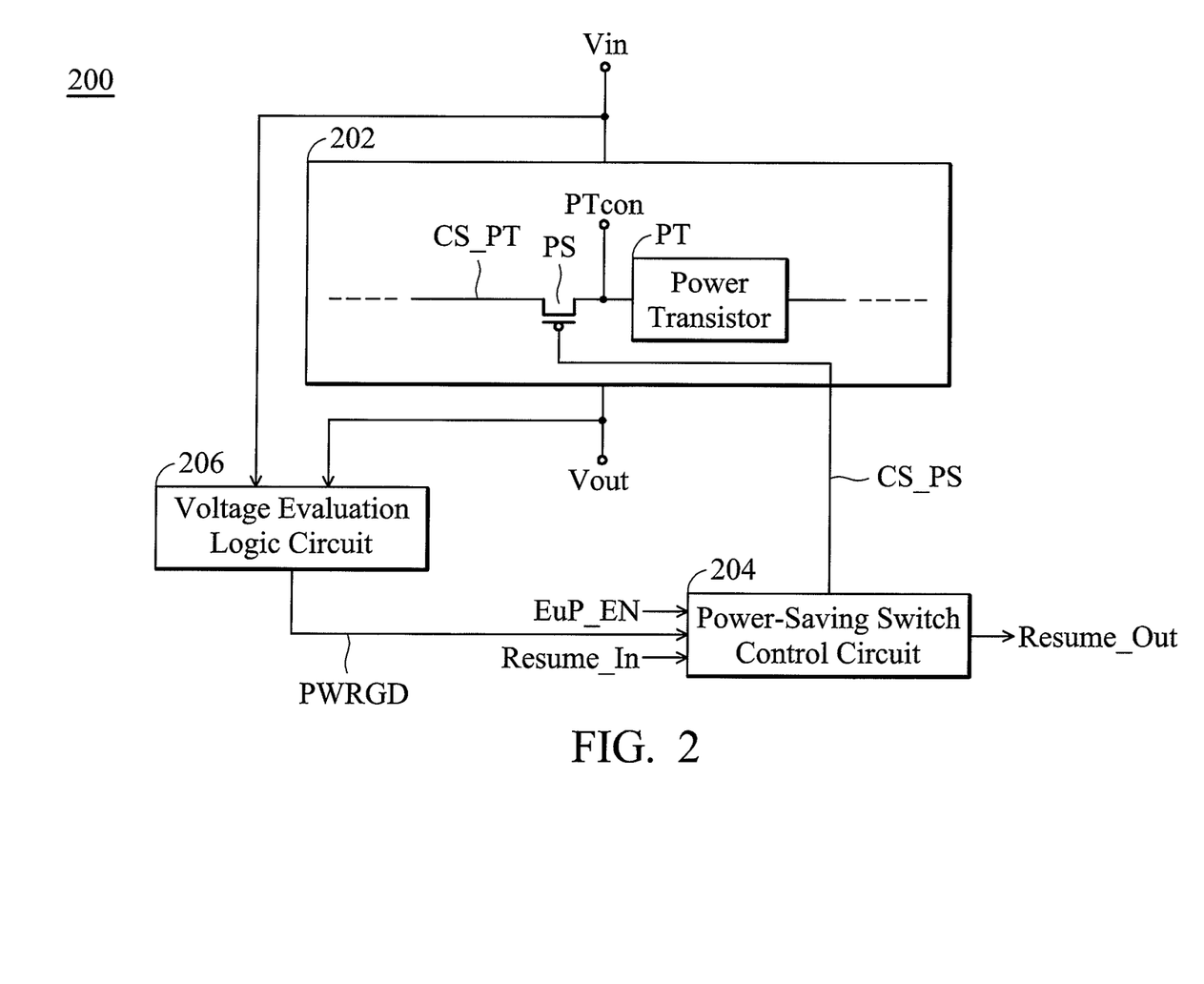
FIG. 2 depicts a voltage regulator 200 in accordance with an exemplary embodiment of the disclosure.

FIG. 2 depicts a voltage regulator 200 in accordance with an exemplary embodiment of the disclosure. In the voltage regulator 200, the fundamental structure 202 for voltage conversion from a first voltage Vin to a second voltage Vout may be established in accordance with the LDO regulator design or switching voltage regulator design. The fundamental structure 202 for voltage regulation uses a power transistor PT to drive the conversion from the first voltage Vin to the second voltage Vout. The voltage regulator 200 further includes a power-saving switch PS having one terminal coupled to a control terminal PTcon of the power transistor PT. The voltage regulator 200 further includes a power-saving switch control circuit 204 outputting a control signal CS_PS to control the power-saving switch PS. When the power-saving switch PS is turned on, the control signal CS_PT for the power transistor PT is coupled to the control terminal PTcon of the power transistor PT. When the power-saving switch PS is turned off, the control signal CS_PT for the power transistor PT is decoupled from the control terminal PTcon of the power transistor PT.

In the exemplary embodiment of FIG. 2, the power-saving switch control circuit 204 operates in accordance with a power-saving enable signal EuP_EN. The power-saving enable signal EuP_EN is switched to an enable state when a module powered by the second voltage Vout is switched to a standby mode (e.g., a standby power state S5 of a computing system). When the module powered by the second voltage Vout is switched to the standby mode, the power-saving enable signal EuP_EN is switched to the enable state and the power-saving switch control circuit 204 turns off the power-saving switch PS.

The voltage regulator 200 of FIG. 2 further includes a voltage evaluation logic circuit 206 which outputs a power flag PWRGD in accordance with the first voltage Vin and the second voltage Vout to indicate whether the second voltage Vout is reliable. As shown, the power-saving switch control circuit 204 further receives a resumption trigger signal Resume_In and the power flag PWRGD. When the resumption trigger signal Resume_in is enabled and the power flag PWRGD shows that the second voltage Vout is reliable, the power-saving switch control circuit 204 outputs a resumption output signal Resume_Out to wake up the module powered by the second voltage Vout.

Figure 3:
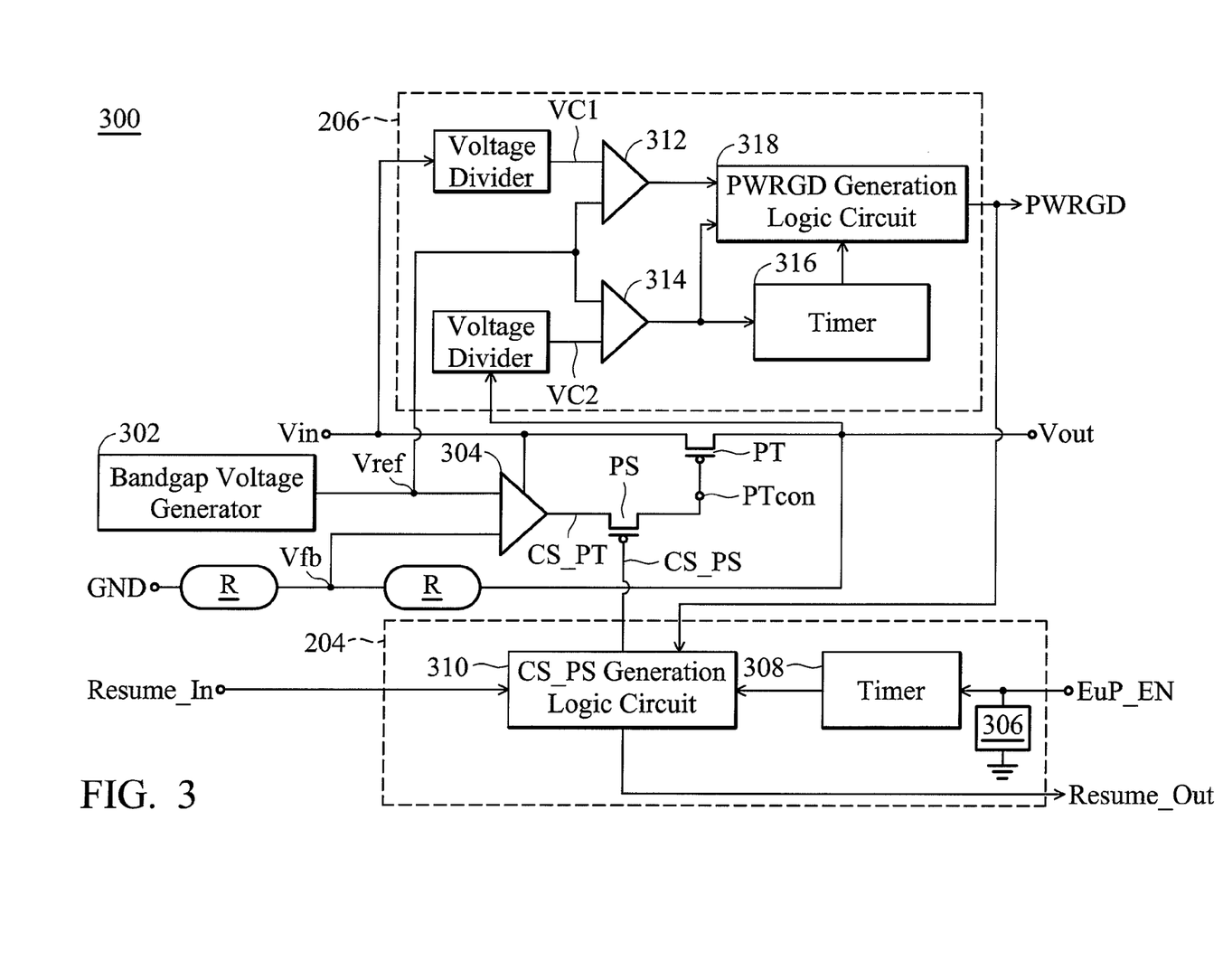
FIG. 3 depicts a voltage regulator 300 in accordance with an exemplary embodiment of the disclosure, wherein a fundamental structure (corresponding to block 202 of FIG. 2) for voltage regulation based on the LDO regulator design is depicted.

FIG. 3 depicts a voltage regulator 300 which includes a fundamental structure (corresponding to 202 of FIG. 2) for voltage regulation based on the LDO regulator design. As shown, a reference voltage Vref generated by a bandgap voltage generator 302 is transmitted to the comparator 304. The comparator 304 compares the reference voltage Vref and a feedback voltage Vfb to generate a control signal CS_PT for the power transistor PT. The control signal CS_PT is transmitted to the power transistor PT through the power-saving switch PS to adjust the conductive channel of the power transistor PT and thereby the second voltage Vout is adjusted. In this exemplary embodiment, the feedback voltage Vfb is generated by a voltage divider that includes two resistors R (not limited thereto). The feedback voltage Vfb may be generated by other feedback technologies.

Referring to FIG. 3, the power-saving control circuit 204 includes an internal pull-down resistance 306, a timer 308, and a logic circuit 310 generating the control signal CS_PS.

The internal pull-down resistance 306 is coupled to a receiving port of the power-saving switch control circuit 204 that receives the power-saving enable signal EuP_EN. By the internal pull-down resistance 306, the voltage level of the receiving port is prevented from floating with an unknown tri-state signal that provided by a module which sources power from the second voltage Vout of this regulator and Vout already be shut down by power-saving switch control circuit 204. The timer 308 counts the time of the enable state of the power-saving enable signal EuP_EN and determines whether the power-saving enable signal EuP_EN has been enabled longer than a predetermined time period. If yes, the logic circuit 310 for generation of the control signal CS_PS confirms the request to save power and switches the control signal CS_PS to turn off the power-saving switch PS for shutting down the generation of the second voltage Vout. The predetermined time period may be 0 in other exemplary embodiments.

To resume the second voltage Vout, the logic circuit 310 generates the control signal CS_PS in accordance with the resumption trigger signal Resume_In. When the resumption trigger signal Resume_In indicates a wake-up event, the logic circuit 310 generates the control signal CS_PS to turn on the power-saving switch PS. The control signal CS_PT is transmitted to the power transistor PT through the power-saving switch PS. Thus, the power transistor PT is turned on and the second voltage Vout is raised up. The logic circuit 310 for generation of the control signal CS_PS further checks the reliability of the second voltage Vout. When the power flag PWRGD shows that the second voltage Vout is reliable, the logic circuit 310 generates the resumption output signal Resume_Out to wake up the modules powered by the second voltage Vout.

Referring to FIG. 3, the voltage evaluation logic circuit 206 includes comparators 312 and 314, a timer 316, and a logic circuit 318 for generation of the power flag PWRGD.

By the comparator 312, a voltage value VC1 divided from the first voltage Vin by a voltage divider is compared with the reference voltage Vref to determine whether the first voltage Vin is lower than a lower limit of the first voltage Vin. Once the first voltage Vin drops lower than the lower limit of the first voltage Vin, the logic circuit 318 de-asserts the power flag PWRGD to show that the second voltage Vout is unreliable. The rear circuits, therefore, are protected from being operated on unreliable voltages.

By the comparator 314, a voltage value VC2 divided from the second voltage Vout by a voltage divider is compared with the reference voltage Vref to determine whether the second voltage Vout is higher than a lower limit of the second voltage Vout. The timer 316 is coupled to the output terminal of the comparator 314 to check whether the second voltage Vout has been raised higher than the lower limit of the second voltage Vout for a predetermined time period. If yes, the logic circuit 318 asserts the power flag PWRGD to indicate that the second voltage Vout is reliable. Thus, it ensures that the rear circuits are operated by a reliable voltage source.

The output of the comparator 314 is further transmitted to the logic circuit 318 bypassing the timer 316. When the comparator 314 shows that the second voltage Vout drops lower than the lower limit of the second voltage Vout, the logic circuit 318 de-asserts the power flag PWRGD instantly to show that the second voltage Vout is unreliable, to protect the rear circuits from being operated by unreliable voltages.

Figure 4A:
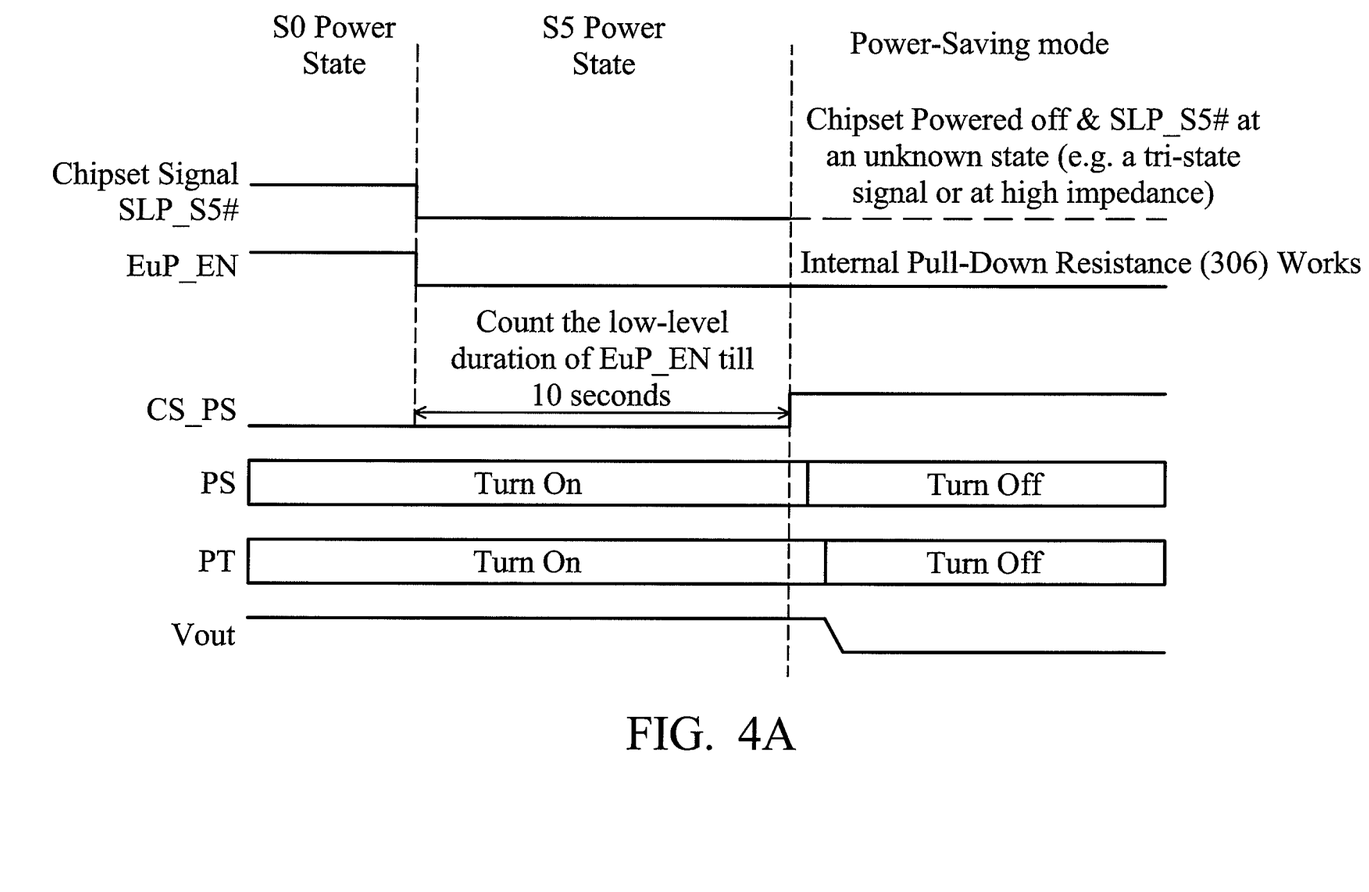
FIGS. 4A, 4B and 4C show waveforms and a flowchart for the power-saving switch control circuit 204, with reference to the power status of the chipset mounted on the motherboard.
Figure 4B:
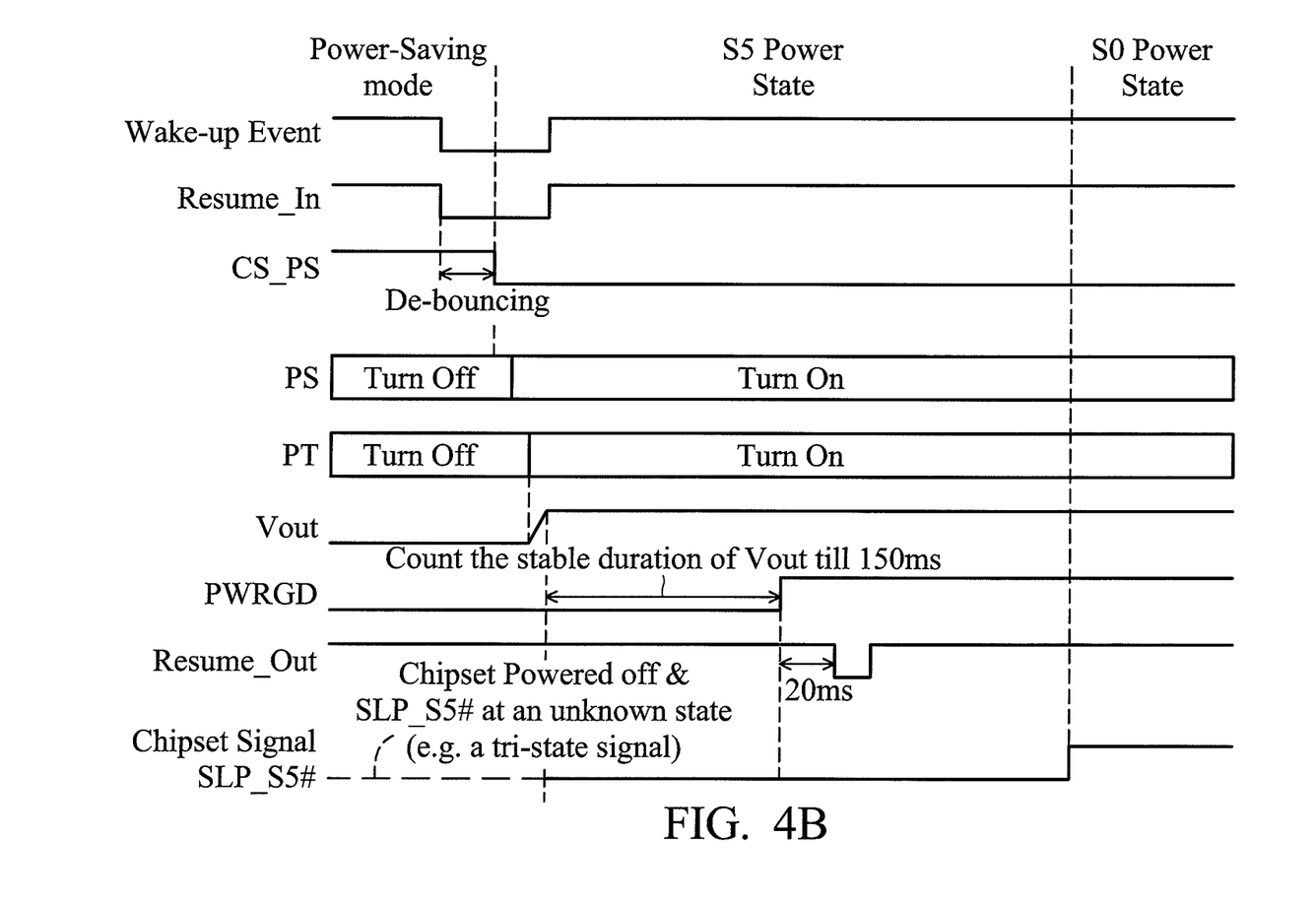
Figure 4C:
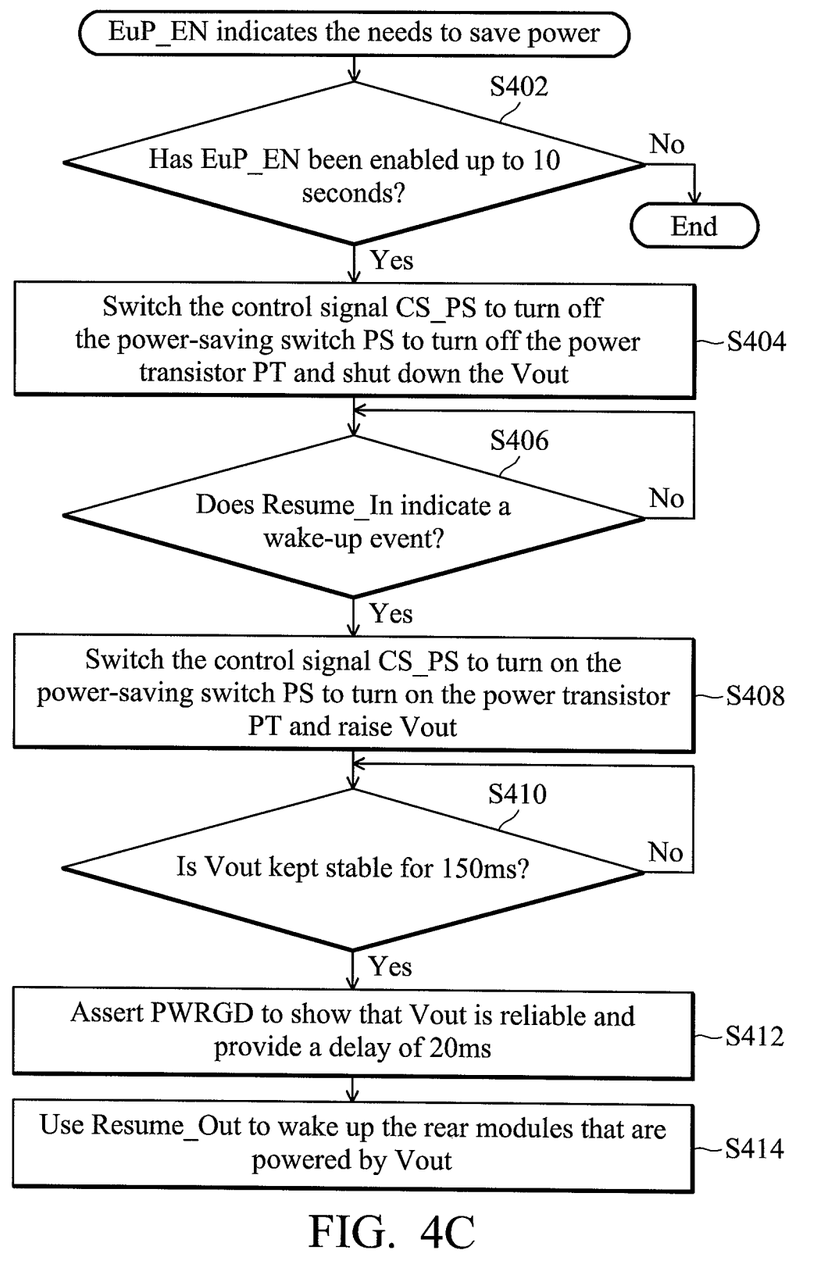

FIGS. 4A, 4B and 4C show waveforms and a flowchart for the power-saving switch control circuit 204, with reference to the power status of the chipset mounted on the motherboard. FIGS. 4A, 4B and 4C are discussed with respect to FIGS. 2 and 3.

Referring to FIG. 4A, when the computing system is switched from a normal power state S0 to a standby power state S5, a chipset signal SLP_S5# transits from high to low and a power-saving enable signal EuP_EN changes. In an exemplary embodiment, the power-saving enable signal EuP_EN is coupled to the chipset signal SLP_S5#. When the chipset signal SLP_S5# is high, the system is operated in the normal power state S0 and the power-saving enable signal EuP_EN is not triggered. When the chipset signal SLP_S5# is low, the system is operated in the standby power state S5 and the power-saving enable signal EuP_EN is switched to the enable state. Once the power-saving enable signal EuP_EN is kept low for 10 seconds (depending on the system settings, e.g., 0 in another exemplary embodiment), the control signal CS_PS of the power switch PS is switched to turn off the power-saving switch PS. Thus, the power transistor PT is turned off and the second voltage Vout drops. The power consumption reduces and the system is switched to a power-saving mode. In an exemplary embodiment, the system in the power-saving mode complies EuP/ErP (Energy Using Product/Energy Related Product) regulations. It means that in the power-saving mode the entire system (including the power supply) consumes less than 0.5 W, and less than 0.25 W is consumed by the system except for the power supply of the system. In an exemplary embodiment, the system consumes less power in the power-saving mode than in the standby mode S5.

Referring to FIG. 4B, when a wake-up event occurs, the system and the chipset mounted on the motherboard of the system is switched from the power-saving mode to the standby power state S5. The resumption trigger signal Resume_In is triggered in accordance with the wake-up event. After de-bouncing the wake-up event, the control signal CS_PS is switched to turn on the power-saving switch PS and, accordingly, the power transistor PT is turned on and the second voltage Vout rises. When the second voltage Vout has remained stable for 150 ms (depending on the system settings), the power flag PWRGD is asserted to show that the second voltage Vout is reliable and, after 20 ms (depending on system settings), the resumption output signal Resume_Out outputs a wake-up event to the chipset then the chipset de-asserts its signal SLP_S5#. The chipset and whole system switch from the standby power state S5 to the normal power state S0.

FIG. 4C is a flowchart depicting the operations of the power-saving switch control circuit 204. In response to the power-saving enable signal EuP_EN indicating the need to save power, step S402 is performed to determine whether the power-saving enable signal EuP_EN has been kept enabled for a predetermined time period, e.g. 10 seconds. When less than 10 seconds, the procedure ends. When the power-saving enable signal EuP_EN has been kept enabled for at least 10 seconds, the control signal CS_PS is switched to turn off the power-saving switch PS to turn off the power transistor PT and thereby the second voltage Vout is shut down (step S404). In step S406, the resumption trigger signal Resume_In is monitored for detection of any wake-up event. Step S406 is repeated when no wake-up event occurs. When a wake-up event occurs, the control signal CS_PS is switched to turn on the power-saving switch PS to turn on the power transistor PT and thereby the second voltage Vout rises (step S408). In step S410, the second voltage Vout is monitored to determine whether the second voltage Vout has been stable for a predetermined time period, e.g. 150 ms. If no, step S410 is repeated. Once the second voltage Vout is kept stable for 150 ms, step S412 is performed to assert the power flag PWRGD to show that the second voltage Vout is reliable and to provide a delay of a predetermined time period, e.g. 20 ms. After the delayed 20 ms, step S414 is performed to use the resumption output signal Resume_Out to wake up the rear modules powered by the second voltage Vout.

Figure 5A:
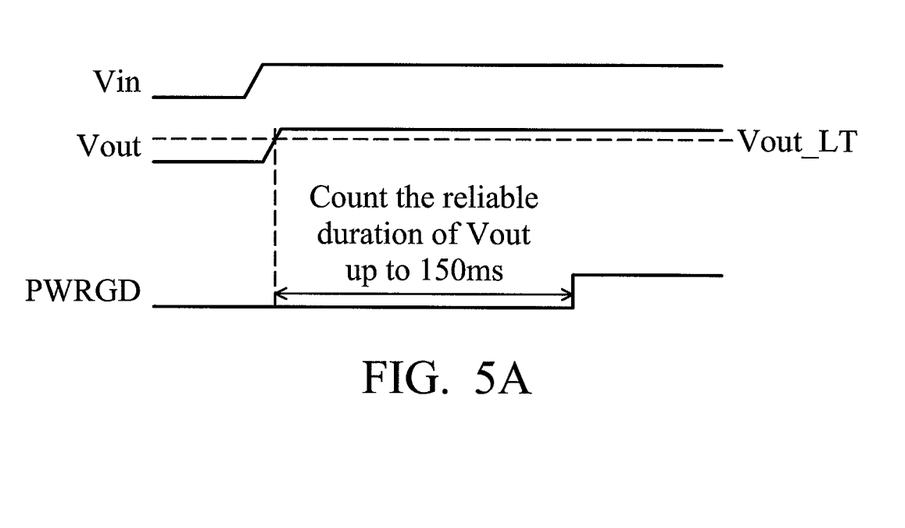
FIGS. 5A, 5B and 5C show waveforms and a flowchart for the voltage evaluation logic circuit 206.
Figure 5B:
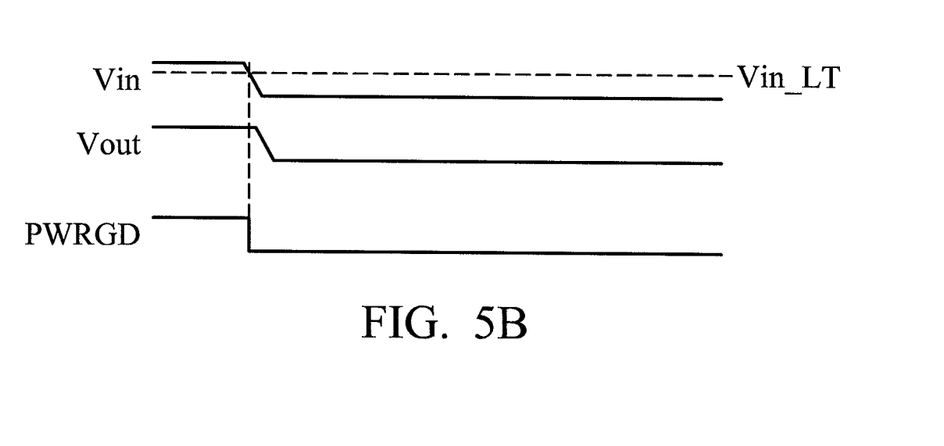
Figure 5C:
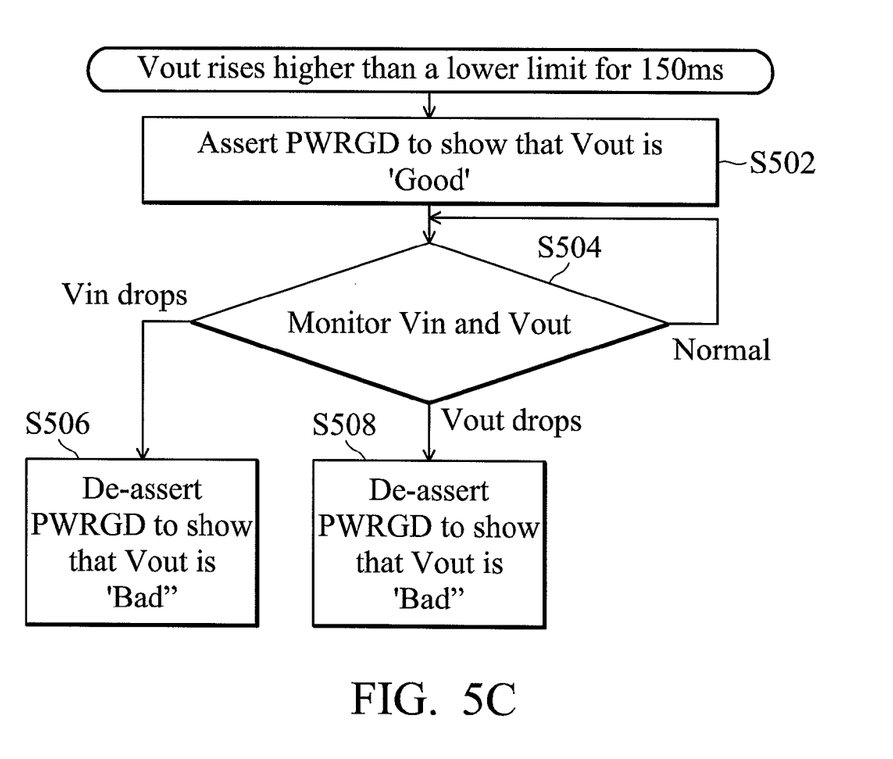

FIGS. 5A, 5B and 5C show waveforms and a flowchart for the voltage evaluation logic circuit 206. FIGS. 5A, 5B and 5C are discussed with respect to FIGS. 2 and 3.

Referring to FIG. 5A, the second voltage Vout is raised when the first voltage Vin is powered on. When the second voltage Vout rises higher than a lower limit Vout_LT for 150 ms (depending on the system settings), the power flag PWRGD is asserted to show that the second voltage Vout is reliable.

Referring to FIG. 5B, once the first voltage Vin drops lower than a lower limit Vin_LT, the power flag PWRGD is de-asserted without waiting for the transition of the second voltage Vout to show that the second voltage Vout is unreliable. When an unexpected event occurs that the second voltage Vout drops but the first voltage Vin is kept stable, the power flag PWRGD is de-asserted instantly to show that the second voltage Vout is unreliable.

FIG. 5C is a flowchart depicting the operations of the voltage evaluation circuit 206. When the second voltage Vout rises higher than a lower limit and kept stable for a predetermined time interval, e.g. 150 ms, step S502 is performed to assert the power flag PWRGD to show that the second voltage Vout is good. In step S504, the first voltage Vin and the second voltage Vout are monitored. When the first voltage Vin drops unexpectedly, step S506 is performed to de-assert the power flag PWRGD to show that the second voltage Vout is bad. When the second voltage Vout drops unexpectedly, step S508 is performed to de-assert the power flag PWRGD to show that the second voltage Vout is bad.

The voltage regulator of the disclosure may be manufactured into chips. FIGS. 6A to 6D show the variants of the voltage regulator 300, not completely packaged in one chip.

Figure 6A:
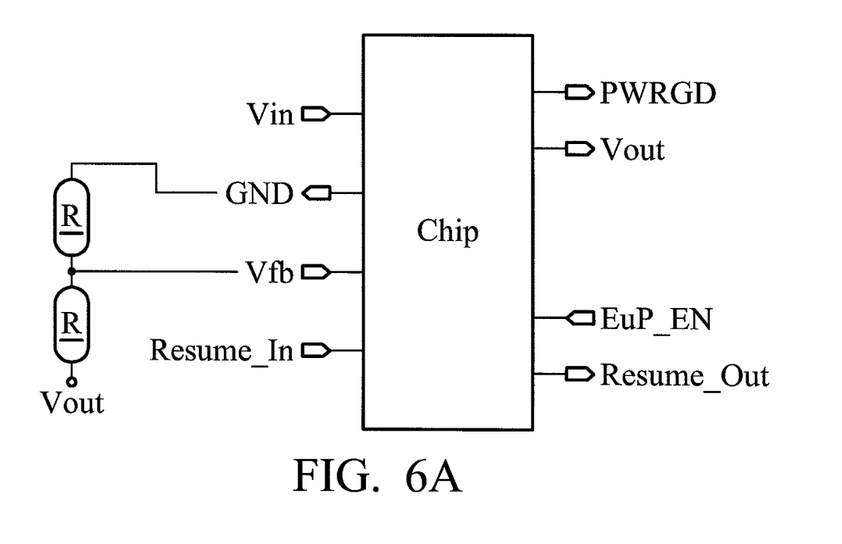
FIGS. 6A to 6D show the variants of the voltage regulator 300, not completely packaged in one chip.

In FIG. 6A, a voltage divider generating the feedback voltage Vfb is external to the chip. The chip has a pin for reception of the feedback voltage Vfb. The voltage divider, external to the chip, for generation of the feedback voltage Vfb, therefore, is easily modified (e.g. just changing the resistance of the voltage divider resistors) for Vout adjustment according to the user's needs. As shown in FIG. 6A, two resistors (both labeled R) are provided to form a voltage divider to generate the feedback voltage Vfb. The voltage divider of FIG. 6A for generation of the feedback voltage Vfb may be replaced by other feedback designs.

Figure 6B:
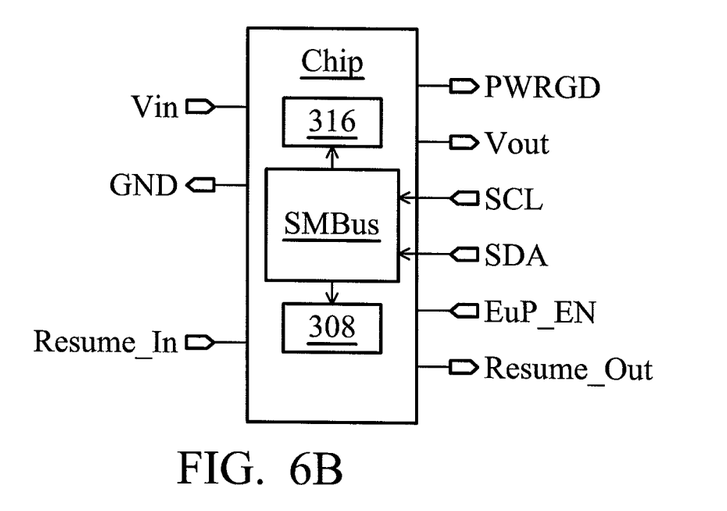

In FIG. 6B, SMBus (System Management Bus) is used in the chip and the chip provides pins for reception of timer control signals SCL and SDA. The timer control signals SCL and SDA received from outside of the chip are transmitted through the SMBus to set the timing threshold of the timer 316 of the voltage evaluation logic circuit 206 and the timing threshold of the timer 308 of the power-saving control circuit 204.

Figure 6C:
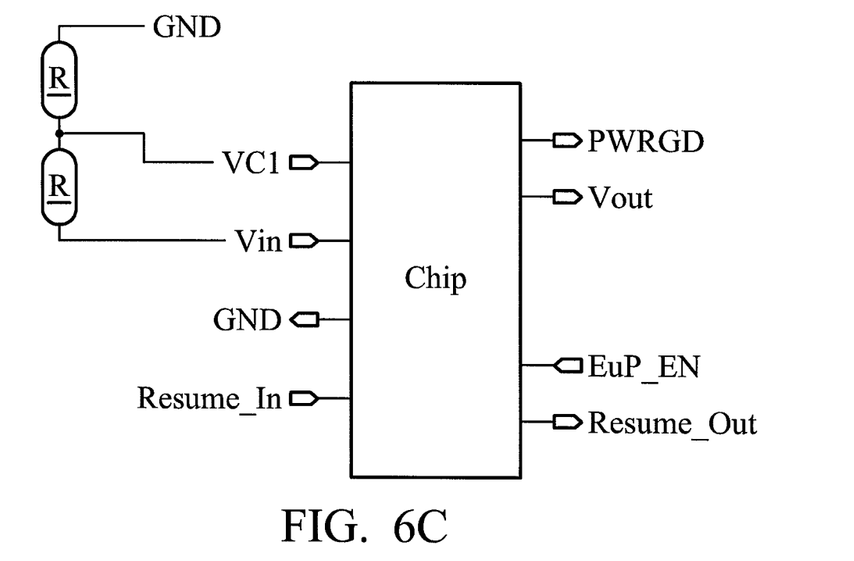

In FIG. 6C, a circuit generating a voltage VC1 as a lower limit Vin_LT for the first voltage Vin is external to the chip. The chip has a pin for reception of the voltage VC1. The voltage divider for generation of the voltage VC1 is easily modified (e.g. just changing the resistance of the voltage divider resistors). As shown in FIG. 6C, two resistors (both labeled R) are provided to form a voltage divider to generate the voltage VC1 as the lower limit Vin_LT. The lower limit Vin_LT may be determined in other ways. Referring to FIG.

3, the voltage VC1 is generated by the voltage divider dividing the first voltage Vin and may be provided within the chip.

Figure 6D:
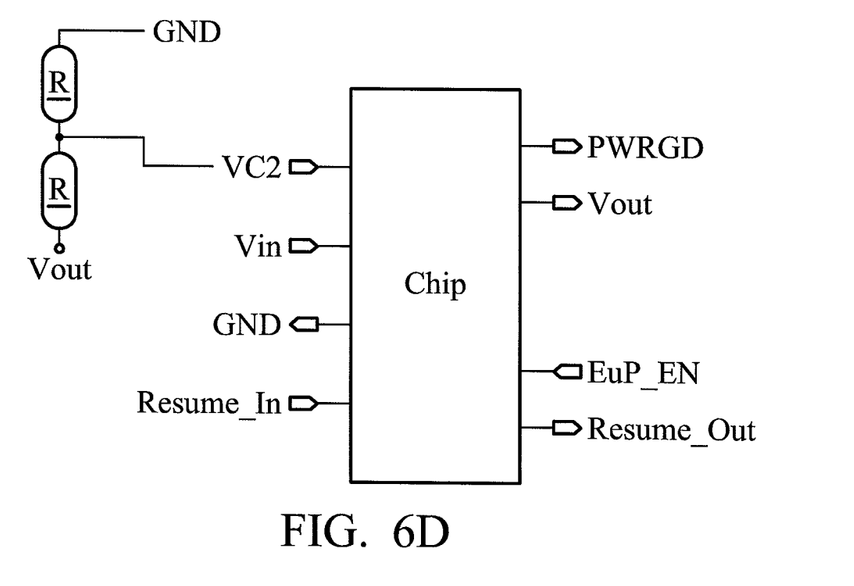

In FIG. 6D, a circuit generating a voltage VC2 as a lower limit Vout_LT for the second voltage Vout is external to the chip. The chip has a pin for reception of the voltage VC2. The voltage divider for generation of the voltage VC2 is easily modified (e.g. just changing the resistance of the voltage divider resistors). As shown in FIG. 6D, two resistors (both labeled R) are provided to form a voltage divider to generate the voltage VC2 as the lower limit Vout_LT. The lower limit Vout_LT may be determined in other ways. Referring to FIG. 3, the voltage VC2 is generated by the voltage divider dividing the second voltage Vout and may be provided within the chip.

Figure 7:
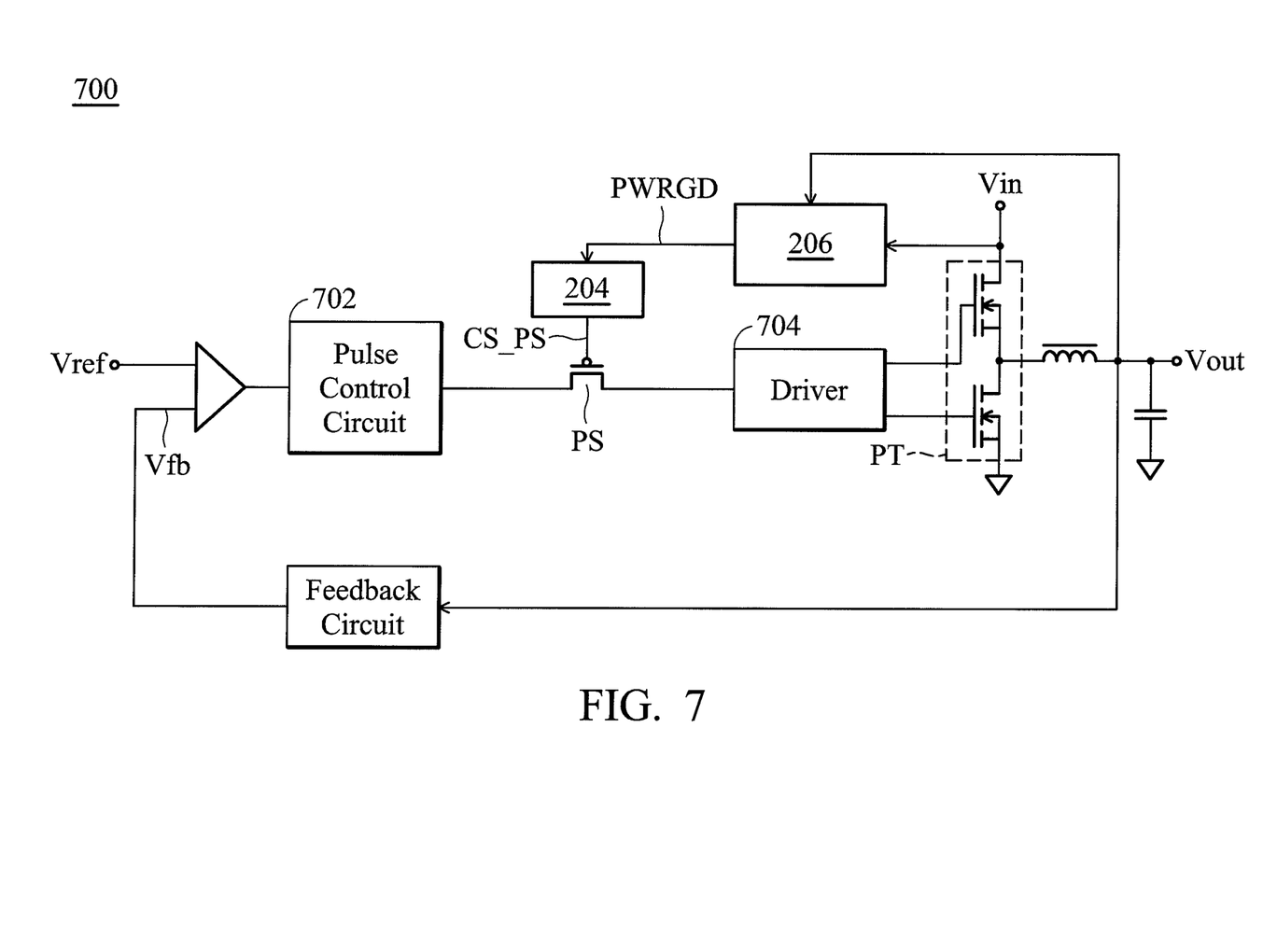
FIG. 7 depicts a voltage regulator 700 in accordance with an exemplary embodiment of the disclosure, wherein a fundamental structure (corresponding to block 202 of FIG. 2) for voltage regulation based on the switching voltage regulator design is depicted.

FIG. 7 depicts a voltage regulator 700 in accordance with an exemplary embodiment of the disclosure, wherein a fundamental structure (corresponding to block 202 of FIG. 2) for voltage regulation based on the switching voltage regulator design is depicted As shown, the power-saving switch PS is provided between a pulse control circuit 702 and a driver 704 of the power transistor PT.

While the invention has been described by way of example and in terms of the embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage regulator, comprising:
   a power transistor, driving a conversion from a first voltage to a second voltage and having a control terminal;
   a power-saving switch having one terminal coupled to the control terminal of the power transistor;
   a power-saving switch control circuit controlling the power-saving switch, and
   a chip, comprising the power transistor, the power-saving switch, the power-saving switch control circuit as well as a system management bus,
   wherein:
   when the power-saving switch is turned on, a control signal for the power transistor is coupled to the control terminal of the power transistor;
   when the power-saving switch is turned off, the control signal for the power transistor is discoupled from the control terminal of the power transistor;
   the power-saving switch control circuit comprises a first timer to determine whether a power-saving enable signal is kept enabled for a first predetermined time period;
   when a module powered by the second voltage is switched to a standby mode, the power-saving enable signal is switched to an enable state;
   when the power-saving enable signal is kept enabled for the first predetermined time period, the power-saving switch control circuit generates a control signal for the power-saving switch to turn off the power-saving switch;
   the chip includes a first pin coupled to the first voltage, a second pin outputting the second voltage, a third pin coupled to ground, a fourth pin receiving the power-saving enable signal and a fifth pin for receiving a first timer control signal; and
   the chip sets the first predetermined time period corresponding to the first timer of the power-saving switch control circuit through the system management bus based on the first timer control signal received by the fifth pin.

2. The voltage regulator as claimed in claim 1, further comprising:
   a voltage evaluation circuit, outputting a power flag to indicate whether the second voltage is reliable according to the first voltage and the second voltage.

3. The voltage regulator as claimed in claim 1, wherein:
   the power-saving switch control circuit further comprises an internal pull-down resistance coupled to a receiving port provided by the power-saving switch control circuit for reception of the power-saving enable signal.

4. The voltage regulator as claimed in claim 2, wherein:
   the power-saving switch control circuit further receives a resumption trigger signal and, when the resumption trigger signal indicates a wake-up event, the power-saving switch control circuit controls the power-saving switch to turn on the power-saving switch.

5. The voltage regulator as claimed in claim 4, wherein:
   the power-saving switch control circuit further generates a resumption output signal that wakes up the module powered by the second voltage when the power flag shows that the second voltage is reliable.

6. The voltage regulator as claimed in claim 2, wherein the voltage evaluation logic circuit comprises:
   a first comparator, comparing whether the first voltage is lower than a lower limit of the first voltage;
   a second comparator, comparing whether the second voltage is higher than a lower limit of the second voltage; and
   a second timer coupled to an output terminal of the second comparator to check whether the second voltage has risen higher than the lower limit of the second voltage for a second predetermined time period.

7. The voltage regulator as claimed in claim 6, wherein:
   the voltage evaluation logic circuit de-asserts the power flag to show that the second voltage is unreliable when the first comparator shows that the first voltage is lower than the lower limit of the first voltage; and
   the voltage evaluation logic circuit asserts the power flag to show that the second voltage is reliable when the second comparator shows that the second voltage rises higher than the lower limit of the second voltage for the second predetermined time period.

8. The voltage regulator as claimed in claim 6, wherein:
   the voltage evaluation logic circuit further de-asserts the power flag to show that the second voltage is unreliable when the second comparator shows that the second voltage drops lower than the lower limit of the second voltage.

9. The voltage regulator as claimed in claim 6, wherein the chip further includes a sixth pin for receiving a second timer control signal; and
   the chip sets the second predetermined time period corresponding to the secondtimer of the voltage evaluation logic circuit through the system management bus based on the second timer control signal received by the sixth pin.

10. A voltage regulator, comprising:
    a power transistor, driving a conversion from a first voltage to a second voltage and having a control terminal;
    a power-saving switch having one terminal coupled to the control terminal of the power transistor;

a power-saving switch control circuit controlling the power-saving switch;

a voltage evaluation circuit, outputting a power flag to indicate whether the second voltage is reliable according to the first voltage and the second voltage; and a chip, comprising the power transistor, the power-saving switch, the power-saving switch control circuit, the voltage evaluation logic circuit as well as a system management bus, wherein:

when the power-saving switch is turned on, a control signal for the power transistor is coupled to the control terminal of the power transistor;

when the power-saving switch is turned off, the control signal for the power transistor is discoupled from the control terminal of the power transistor;

the power-saving switch control circuit turns off the power-saving switch when a module powered by the second voltage is switched to a standby mode; and the voltage evaluation logic circuit comprises:

a first comparator, comparing whether the first voltage is lower than a lower limit of the first voltage;

a second comparator, comparing whether the second voltage is higher than a lower limit of the second voltage; and a first timer coupled to an output terminal of the second comparator to check whether the second voltage has risen higher than the lower limit of the second voltage for a first predetermined time period, wherein the voltage evaluation circuit indicates whether the second voltage is reliable based on the first and second comparators and the first timer;

the chip has a first pin coupled to the first voltage, a second pin outputting the second voltage, a third pin coupled to ground, a fourth pin outputting the power flag, and a fifth pin for receiving a first timer control signal; and the chip sets the first predetermined time period corresponding to the timer of the voltage evaluation logic circuit through the system management bus based on the first timer control signal received by the fifth pin.

11. The voltage regulator as claimed in claim 10, wherein:

the power-saving switch control circuit further comprises a second timer to determine whether a power-saving enable signal is kept enabled for a second predetermined time period and, when the power-saving enable signal is kept enabled for the second predetermined time period, the power-saving switch control circuit generates a control signal for the power-saving switch to turn off the power-saving switch; and the power-saving enable signal is switched to an enable state when the module powered by the second voltage is switched to the standby mode.

12. The voltage regulator as claimed in claim 11, wherein:

the power-saving switch control circuit further comprises an internal pull-down resistance coupled to a receiving port provided by the power-saving switch control circuit for reception of the power-saving enable signal.

13. The voltage regulator as claimed in claim 10, wherein:

the power-saving switch control circuit further receives a resumption trigger signal and, when the resumption trigger signal indicates a wake-up event, the power-saving switch control circuit controls the power-saving switch to turn on the power-saving switch.

14. The voltage regulator as claimed in claim 13, wherein:

the power-saving switch control circuit further generates a resumption output signal that wakes up the module powered by the second voltage when the power flag shows that the second voltage is reliable.

15. The voltage regulator as claimed in claim 10, wherein:

the voltage evaluation logic circuit de-asserts the power flag to show that the second voltage is unreliable when the first comparator shows that the first voltage is lower than the lower limit of the first voltage; and the voltage evaluation logic circuit asserts the power flag to show that the second voltage is reliable when the second comparator shows that the second voltage rises higher than the lower limit of the second voltage for the first predetermined time period.

16. The voltage regulator as claimed in claim 10, wherein:

the voltage evaluation logic circuit further de-asserts the power flag to show that the second voltage is unreliable when the second comparator shows that the second voltage drops lower than the lower limit of the second voltage.

17. The voltage regulator as claimed in claim 11, wherein:

the chip further has a sixth pin for receiving a second timer control signal; and the chip sets the second predetermined time period corresponding to the second timer of the power-saving switch control circuit through the system management bus based on the second timer control signal received by the pin.

* * * * *